US011117354B2

(12) United States Patent
Kitada et al.

(10) Patent No.: US 11,117,354 B2
(45) Date of Patent: Sep. 14, 2021

(54) MULTILAYER FILM FOR DEEP DRAW FORMING AND METHOD FOR MANUFACTURING SAME

(71) Applicant: Kureha Corporation, Tokyo (JP)

(72) Inventors: Ichiro Kitada, Tokyo (JP); Shota Nambu, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 467 days.

(21) Appl. No.: 15/756,105

(22) PCT Filed: Sep. 6, 2016

(86) PCT No.: PCT/JP2016/076147
§ 371 (c)(1),
(2) Date: Feb. 28, 2018

(87) PCT Pub. No.: WO2017/043476
PCT Pub. Date: Mar. 16, 2017

(65) Prior Publication Data
US 2018/0250921 A1 Sep. 6, 2018

(30) Foreign Application Priority Data
Sep. 7, 2015 (JP) .............................. JP2015-175919

(51) Int. Cl.
B32B 27/08 (2006.01)
B32B 27/30 (2006.01)
B32B 27/28 (2006.01)
B32B 7/12 (2006.01)
B32B 27/32 (2006.01)
B32B 37/12 (2006.01)
B65D 1/00 (2006.01)
B65D 1/26 (2006.01)
B65D 65/40 (2006.01)
B29C 51/14 (2006.01)
B29C 35/08 (2006.01)
B29C 55/14 (2006.01)
B29K 23/00 (2006.01)
B29K 27/00 (2006.01)
B29C 55/28 (2006.01)
B29C 55/00 (2006.01)
B29L 31/00 (2006.01)

(52) U.S. Cl.
CPC .......... *B32B 27/08* (2013.01); *B29C 35/0805* (2013.01); *B29C 51/14* (2013.01); *B29C 55/143* (2013.01); *B32B 7/12* (2013.01); *B32B 27/28* (2013.01); *B32B 27/30* (2013.01); *B32B 27/304* (2013.01); *B32B 27/306* (2013.01); *B32B 27/32* (2013.01); *B65D 1/00* (2013.01); *B65D 1/26* (2013.01); *B65D 65/40* (2013.01); B29C 55/005 (2013.01); B29C 55/28 (2013.01); B29C 2035/0838 (2013.01); B29K 2023/0616 (2013.01); B29K 2023/083 (2013.01); *B29K 2027/08* (2013.01); *B29K 2995/0053* (2013.01); *B29K 2995/0067* (2013.01); *B29L 2031/712* (2013.01); *B32B 37/12* (2013.01); *B32B 2250/04* (2013.01); *B32B 2307/30* (2013.01); *B32B 2307/518* (2013.01); *B32B 2307/72* (2013.01); *B32B 2307/7244* (2013.01); *B32B 2307/732* (2013.01); *B32B 2307/738* (2013.01); *B32B 2307/748* (2013.01); *B32B 2309/105* (2013.01); *B32B 2435/02* (2013.01); *B32B 2439/70* (2013.01)

(58) Field of Classification Search
CPC ...... B32B 27/08; B32B 27/304; B32B 27/306
See application file for complete search history.

(56) References Cited

U.S. PATENT DOCUMENTS

| 4,863,768 A | 9/1989 | Ishio et al. |
| 6,437,064 B1 * | 8/2002 | Eckstein ................. B32B 27/08 526/160 |
| 2001/0003624 A1 | 6/2001 | Lind et al. |
| 2007/0237915 A1 | 10/2007 | Ishii et al. |

FOREIGN PATENT DOCUMENTS

| JP | 64-500180 A | 1/1989 |
| JP | 9-502401 A | 3/1997 |
| JP | 2007-160574 A | 6/2007 |

(Continued)

OTHER PUBLICATIONS

Extended European Search Report dated Jul. 11, 2018, in European Patent Application No. 16844337.2.

(Continued)

Primary Examiner — Sheeba Ahmed
(74) Attorney, Agent, or Firm — Birch, Stewart, Kolasch & Birch, LLP

(57) ABSTRACT

To provide a multilayer film that enables easy opening of a packaging material manufactured by deep draw forming. A multilayer film for deep draw forming, including: a vinylidene chloride copolymer resin layer as a middle layer; a crosslinked olefin resin layer as a first surface layer; and an ethylene/vinyl acetate copolymer resin layer as a second surface layer; where the ethylene/vinyl acetate copolymer resin layer is further provided either at least between the vinylidene chloride copolymer resin layer as the middle layer and crosslinked olefin resin layer as the first surface layer, or between the vinylidene chloride copolymer resin layer as the middle layer and ethylene/vinyl acetate copolymer resin layer as the second surface layer.

6 Claims, No Drawings

(56) References Cited

FOREIGN PATENT DOCUMENTS

| JP | 2007296842 A | 11/2007 |
|---|---|---|
| JP | 2014124911 A | 7/2014 |
| WO | WO1987007880 A1 | 12/1987 |
| WO | WO 95/00333 A1 | 1/1995 |

OTHER PUBLICATIONS

Office Action dated Jul. 31, 2018, in Australian Patent Application No. 2016320942.
Notification of Reasons for Refusal dated Apr. 9, 2019, in Japanese Patent Application No. 2015-175919.
Office Action dated Oct. 15, 2019, in Japanese Patent Application No. 2015-175919.
International Search Report for PCT/JP2016/076147 dated Nov. 22, 2016.

* cited by examiner

MULTILAYER FILM FOR DEEP DRAW FORMING AND METHOD FOR MANUFACTURING SAME

TECHNICAL FIELD

The present invention relates to a multilayer film for deep draw forming that is useful as a lid material, bottom material, or the like for deep draw forming, and a method for manufacturing the same.

BACKGROUND ART

Conventionally, multilayer films with stretching and shrinking properties are widely used in food packaging of raw meat, processed meat products, fish, cheese, or soup. A method of filling and packaging contents in a bag or pouch bag, a method of filling and packaging in a film immediately after making a bag using a vertical pillow/horizontal pillow packaging machine, a method of filling and packaging by deep draw forming, and the like are general performed as a method of packaging these contents.

If unstretched and nonshrinkable multilayer films are used, and particularly, if irregular shaped contents such as ham, grilled pork, and bacon are filled and packaged in the method of filling and packaging by conventional deep draw forming, the shrinkability of the film is inferior, and therefore, there are disadvantages where wrinkles are prone to occur in the packaging material, fittability with the contents is insufficient, and juice of the contents is more likely to pool. Furthermore, the shrinkability of the films is inferior, and therefore, there are disadvantages where adhesion of the film deteriorates, and storability of the content deteriorates.

Therefore, J P 2007-296842 A (Patent Document 1) discloses a heat-shrinkable multilayer film for deep draw forming having a predetermined hot water shrinkage rate, where a resin layer containing a first thermoplastic resin is laminated on at least one side of a middle layer containing a vinylidene chloride copolymer resin, and an inner layer containing a sealant resin having a melting point that is no lower than 5° C. lower than the melting point of the first thermoplastic resin is provided, as heat-shrinkable multilayer film for deep draw forming having tight fittability with contents due to shrinkage and excellent deep draw suitability.

CITATION LIST

Patent Literature

Patent Document 1: JP 2007-296842 A

SUMMARY OF INVENTION

Technical Problem

However, if packaging material manufactured by deep draw forming the heat-shrinkable multilayer film according to Patent Document 1 is opened, the multilayer film may not be able to be cut straight by the incision, and thus a multilayer film for deep draw forming that can be easily opened is required.

In view of the foregoing problems with conventional techniques, an object of the present invention is to provide a multilayer film that enables easy opening of a packaging material manufactured by deep draw forming.

Solution to Problem

As a result of extensive studies in order to achieve the aforementioned object, the present inventors discovered that a multilayer film can be cut straight and opened from an incision, and packaging material manufactured by deep draw forming the multilayer film can be easily opened, by forming an innermost layer of the multilayer film using an ethylene/vinyl acetate copolymer resin, thereby arriving at the completion of the present invention.

In other words, a multilayer film for deep draw forming of the present invention includes: a vinylidene chloride copolymer resin layer as a middle layer; a crosslinked olefin resin layer as a first surface layer; and an ethylene/vinyl acetate copolymer resin layer as a second surface layer; where the ethylene/vinyl acetate copolymer resin layer is further provided at least either between the vinylidene chloride copolymer resin layer as the middle layer and crosslinked olefin resin layer as the first surface layer, or between the vinylidene chloride copolymer resin layer as the middle layer and ethylene/vinyl acetate copolymer resin layer as the second surface layer.

The multilayer film for deep draw forming is preferably obtained by performing a 10 to 40% relaxation treatment in a longitudinal direction and lateral direction, on a multilayer biaxially stretched film prepared by irradiating an energy beam from the olefin resin layer side onto a multilayer unstretched film including a vinylidene chloride copolymer resin layer as a middle layer, a olefin resin layer as a first surface layer, and an ethylene/vinyl acetate copolymer resin layer as a second surface layer, where an ethylene/vinyl acetate copolymer resin layer is further provided at least either between the vinylidene chloride copolymer resin layer as the middle layer and olefin resin layer as the first surface layer, or between the vinylidene chloride copolymer resin layer as the middle layer and ethylene/vinyl acetate copolymer resin layer as the second surface layer, so as to crosslink the olefin resin, and then biaxially stretching 2.5 to 4 times in the longitudinal direction and lateral direction; or on a multilayer biaxially stretched film prepared by biaxially stretching 2.5 to 4 times in the longitudinal direction and lateral direction the multilayer unstretched film, and then irradiating an energy beam from the olefin resin layer side to crosslink the olefin resin.

A bottom material film and lid material film for deep draw forming of the present invention include the multilayer film for deep draw forming of the present invention. Furthermore, a packaging material of the present invention includes the bottom material film of the present invention, the lid material film of the present invention, and a packaging target material enclosed by the bottom material film and lid material film, where the crosslinked olefin resin layer is an outermost layer, and the ethylene/vinyl acetate copolymer resin layer is an innermost layer.

A method of manufacturing a multilayer film for deep draw forming or the present invention is a method including: a step of irradiating an energy beam from the olefin resin layer side onto a multilayer unstretched film including a vinylidene chloride copolymer resin layer as a middle layer, a olefin resin layer as a first surface layer, and an ethylene/vinyl acetate copolymer resin layer as a second surface layer, where the ethylene/vinyl acetate copolymer resin layer is further provided at least either between the vinylidene chloride copolymer resin layer as the middle layer and olefin resin layer as the first surface layer, or between the vinylidene chloride copolymer resin layer as the middle layer and ethylene/vinyl acetate copolymer resin layer as the second surface layer, so as to crosslink the olefin resin, and then biaxially stretching 2.5 to 4 times in the longitudinal direction and lateral direction to prepare a multilayer biaxially stretched film; or biaxially stretching 2.5 to 4 times in the longitudinal direction and lateral direction the multilayer unstretched film, irradiating an energy beam from the olefin resin layer side, and crosslinking the olefin resin to prepare a multilayer biaxially stretched film; and a step of performing a 10 to 40% relaxation treatment in the longitudinal direction and lateral direction to obtain the multilayer film for forming a deep drawing according to claim 1.

Advantageous Effects of Invention

According to the present invention, a multilayer film that enables easy opening of a packaging material manufactured by deep draw forming can be obtained.

DESCRIPTION OF EMBODIMENTS

The present invention will be described in detail hereafter using preferred embodiments thereof.

First, the multilayer film for deep draw forming of the present invention will be described. A multilayer film for deep draw forming of the present invention includes: a vinylidene chloride copolymer resin layer as a middle layer; a crosslinked olefin resin layer as a first surface layer; and an ethylene/vinyl acetate copolymer resin layer as a second surface layer; where the ethylene/vinyl acetate copolymer resin layer is further provided at least either between the vinylidene chloride copolymer resin layer as the middle layer and crosslinked olefin resin layer as the first surface layer, or between the vinylidene chloride copolymer resin layer as the middle layer and ethylene/vinyl acetate copolymer resin layer as the second surface layer.

Vinylidene Chloride Copolymer Resin

A vinylidene chloride copolymer resin (hereinafter, may be referred to as "PVDC resin") used in the present invention is a resin containing a copolymer obtained by copolymerizing 60 to 98 mass % of vinylidene chloride and 2 to 40 mass % of another monomer copolymerizable with the vinylidene chloride. A middle layer containing the PVDC resin functions as a gas barrier layer in the multilayer film of the present invention.

Therefore, examples of the monomer (comonomer) copolymerizable with the vinylidene chloride include: vinyl chlorides; methyl acrylates, ethyl acrylates, butyl acrylates, lauryl acrylates, and other alkyl acrylate esters (alkyl groups with 1 to 18 carbon atoms); methyl methacrylates, butyl methacrylates, lauryl methacrylates, and other alkyl methacrylate esters (alkyl group with 1 to 18 carbon atoms); acrylonitriles and other vinyl cyanides; styrenes and other aromatic vinyls; vinyl acetates and other vinyl esters of an aliphatic carboxylic acid with 1 to 18 carbon atoms; alkyl vinyl ethers with 1 to 18 carbon atoms; acrylic acids, methacrylic acids, maleic acids, fumaric acids, and other unsaturated carboxylic acids polymerizable with vinyl; and maleic acids, fumaric acids, itaconic acids, and other alkyl esters (including partial esters with alkyl group; alkyl groups with 1 to 18 carbon atoms) of unsaturated carboxylic acids polymerizable with vinyl. One type of the comonomers may be used independently, or two or more types thereof may be used in combination.

Furthermore, of the comonomers, a vinyl chloride, methyl acrylate, or lauryl acrylate is preferably used. Note that a copolymerization ratio of the comonomers is preferably with a range of 3 to 35 mass %, more preferably 3 to 25 mass %, and particularly preferably 4 to 20 mass %. When the copolymerization ratio of the comonomers is less than the lower limit, internal plasticization is insufficient, and melt processability tends to be reduced, but on the other hand, when the ratio exceeds the upper limit, gas barrier properties tend to be reduced.

A reduced viscosity [$\eta$sp/C; unit=L/g] of the PVDC resin used in the present invention is preferably 0.035 to 0.070, more preferably 0.040 to 0.067, and particularly preferably 0.045 to 0.063, from the perspective of melt processability, stretch processability, packaging machinery suitability, cold resistance, and the like when molding into a film. When the reduced viscosity of the PVDC resin is less than the lower limit, stretch processability is reduced, and mechanical properties of a biaxially stretched film also tend to be reduced. On the other hand, when the upper limit is exceeded, melt processability is reduced, coloring tends to occur, and transparency tends to be impaired. Note that in the present invention, two or more types of PVDC resins with a different reduced viscosity may be used in combination.

The PVDC resin used in the present invention can be synthesized by an arbitrary polymerizing method such as a suspension polymerizing method, emulsion polymerizing method, solution polymerizing method, and the like, but is preferably synthesized by an emulsion polymerizing method if a compound is formed as a powder resin. Therefore, if synthesized by a suspension polymerizing method, a pulverizing step for adjusting the particle size of the powder resin containing the PVDC resin tends to not be required. The particle size of the powder resin containing the PVDC resin is preferably within a range of 40 to 600 and more preferably within a range of 50 to 500 Note that the particle size of the powder resin can be measured by a dry sieving method using a standard sieve for example.

The PVDC resin can include a polyethylene wax, oxidized polyethylene wax, polyethylene (low density, high density), ethylene/vinyl acetate copolymer, homopolymer or copolymer of an acrylic ester, homopolymer or copolymer of a methacrylic ester, methyl methacrylate-butadiene-styrene copolymer, and other resins, if necessary. Furthermore, the acrylic ester and methacrylic ester are preferably an alkyl ester with 1 to 18 carbon atoms in the alkyl group. Note that if the other resins are used, the added amount is preferably 20 parts by mass or less with regard to 100 parts by mass of the PVDC resin.

Furthermore, the PVDC resin can further include a thermal stabilizer, plasticizer, antioxidant, glidant, or various other additives, if necessary. The various additives may be included in the monomer composition when manufacturing powder resin using a suspension polymerizing method. Therefore, when various additives are added to the powder resin when manufacturing the powder resin using a suspension polymerizing method, a liquid additive is absorbed by the powder resin, and a solid additive tends to adhere to a surface of the powder resin, under temperature conditions when manufacturing the powder resin.

Examples of the thermal stabilizer can include epoxidized vegetable oils, epoxidized animal oils, epoxidized fatty acid esters, epoxy resin prepolymers, and other epoxy compounds; and resins containing an epoxy group. One type of the thermal stabilizer may be used independently, or two or more types thereof may be used in combination. By adding the thermal stabilizer to the PVDC resin according to the present invention, there is a tendency that the thermal stability of a PVDC resin compound can be improved.

Furthermore, a product where a double bond is modified into an oxirane ring by epoxidizing natural animal and vegetable oils having an unsaturated bond using hydrogen peroxide, peracetic acid, or the like can be used as the epoxidized vegetable oil and epoxidized animal oil. An epoxidized soybean oil, epoxidized linseed oil, and the like are preferable as the epoxidized vegetable oil. Examples of the epoxidized fatty acid ester include epoxidized products of epoxidized octyl stearates and other unsatustretching ratiod fatty acid esters. Examples of the epoxy resin prepolymer include bisphenol A glycidyl ethers and the like.

Furthermore, the resin containing an epoxy group is preferably a resin containing at least one epoxy group, and is not particularly limited, and an acrylic resin containing a glycidyl group and methacrylic resin containing a glycidyl group are preferably used for example. The acrylic resin and/or methacrylic acid containing a glycidyl group is preferably a copolymer containing a glycidyl ester of a unsaturated organic acid polymerizable with vinyl as a copolymer component. The acrylic resin and/or methacrylic resin containing a glycidyl group is preferably a copolymer of a glycidyl ester of a unsaturated organic acid polymerizable with vinyl, and another ethylenic unsaturated monomer copolymerizable with an acrylic ester and/or methacrylic ester not containing a glycidyl group and with monomers thereof.

Furthermore, examples of the acrylic resin and/or methacrylic resin containing a glycidyl group include glycidyl methacrylate-methyl methacrylate-styrene-butyl acrylate copolymers, glycidyl methacrylate-methyl methacrylate copolymers, glycidyl methacrylate-methyl methacrylate-styrene copolymers, glycidyl methacrylate-vinyl chloride copolymers, glycidyl methacrylate-ethyl acrylate copolymers, gylcidyl methacrylate-butyl acrylate copolymers, and glydicyl methacrylate-vinylidene chloride copolymers.

Of these thermal stabilizers, epoxidized vegetable oil is preferably used in the field of food packaging material. A portion of the used amount of the thermal stabilizer such as the epoxidized vegetable oil or the like is included in a monomer composition in a step of polymerizing the PVDC resin to prepare a powder resin, and the remaining amount thereof can be added to the powder resin when preparing a compound. Furthermore, the total amount of the used thermal stabilizer may be added during polymerization, or may be blended with the powder resin when preparing a compound.

If thermal stabilizers are used, the added amount is preferably within a range of 0.05 to 6 parts by mass, more preferably within a range of 0.08 to 5 parts by mass, and particularly preferably within a range of 0.1 to 4 parts by mass, with regard to 100 parts by mass of the PVDC resin. When the added amount of the thermal stabilizer is less than the lower limit, the thermal stability of the PVDC resin compound cannot be sufficiently improved, a molding process is difficult, and blackening tends to occur. On the other hand, when the upper limit is exceeded, gas barrier properties and cold resistance of a biaxially stretched film tends to be reduced, and a fish eye phenomenon tends to occur.

Examples of the plasticizer include, dioctyl phthalate, acetyl tributyl citrate, dibutyl sebacate, dioctyl sebacate, acetylated monoglyceride, acetylated diglyceride, acetylated triglyceride, acetylated glycerides containing two to three thereof, adipic acid and 1,3-butanediol, adipic acid and 1,4-butanediol, mixtures of two or more types thereof, and other polyester plasticizers. One type of the plasticizer may be used independently, or two or more types thereof may be used in combination.

The plasticizers can either be included in the generated powder resin of the PVDC resin in the step of polymerizing the PVDC resin, blended with the powder resin of the PVDC resin, or included in the PVDC resin compound by a combined method thereof. Furthermore, in order to include the plasticizer in the powder resin generated in the step of polymerizing the PVDC resin, a vinylidene chloride and another monomer copolymerizable therewith can be copolymerized in the presence of the plasticizer, or the plasticizer can be added after copolymerizing to prepare the powder resin of the PVDC resin. Furthermore, the plasticizer can be included in the powder resin of the PVDC resin, and an additional plasticizer can be blended if necessary during blending. Furthermore, the total amount of the used plasticizer may be added during polymerization, or may be blended with the powder resin when preparing a compound.

If the plasticizer is used, the added amount is preferably within a range of 0.05 to 10 parts by mass, and more preferably within a range of 0.1 to 5 parts by mass, with regard to 100 parts by mass of the PVDC resin. When the added amount of the plasticizer is less than the lower limit, a plasticizing effect is inferior, and a melt extrusion process tends to be difficult, but on the other hand, if the amount exceeds the upper limit, the gas barrier properties tends to deteriorate.

Examples of the antioxidants include: 2,6-di-tert-butyl-4-methyl-phenol (BHT), triethylene glycol-bis [3-(3-tert-butyl-4-hydroxy-5-mmethyl phenyl) propionate] (for example, "Irganox 245" (registered trademark) manufactured by BASF), 2,4-dimethyl-6-S-alkyl phenol, 2,4-dimetyl-6-(1-methyl pentadecyl) phenol, octadecyl-3-(3,5-di-tert-butyl-4-hydroxy phenyl) propionate (for example, "Irganox 1076" (registered trademark) manufactured by BASF), and other phenolic antioxidants; thiopropionic acid, distearyl thioproprionate, and other thioether antioxidants; trisnonyl phenyl phosphite, distearyl pentaerythritol diphosphite, and other phosphite antioxidants; and the like. If the antioxidant is used, the added amount is normally 0.0001 to 0.05 parts by mass with regard to 100 parts by mass of the PVDC resin.

Examples of the glidants suitable for melt processing of the PVDC resin include: polyethylene oxide waxes, paraffin waxes, polyethylene waxes, montanic ester waxes, calcium montanate waxes, and other waxes; and glycerin monoesters, and other fatty acid esters. Furthermore, examples of glidants suitable for melt processing of the PVDC resin and secondary processing of a film include monoamides or bisamides of stearic acid amides and other fatty acids, and the like. If the glidants are used, the added amount is normally 2 parts by mass or less with regard to 100 parts by mass of the PVDC resin. Note that a glidant with inferior compatibility with regard to the PVDC resin and where color unevenness or phase separation easily occurs on a molded product is preferably not added, or the amount is minimized.

Another stabilizer, ultraviolet absorber, pH adjuster, or the like can be further included, if necessary, in the PVDC resin used in the present invention.

An appropriate amount of a magnesium hydroxide, magnesium oxide, calcium hydroxyphosphate, and another inorganic base, citric acid, alkali metal citrate salt, and another organic weak acid salt, ethylene diamine tetraacetic acid, or the like can be used as the other stabilizer.

Examples of the ultraviolet absorber include 2-(2'-hydroxy-3',5'-di-tert-butyl phenyl)-5-chorobenzotriazole and the like, and an appropriate amount can be used if necessary.

Examples of the pH adjuster include sodium pyrophosphate, disodium dihydrogen pyrophosphate, and the like. If the pH adjusters are used, the added amount is preferably 0.5 parts by mass or less with regard to 100 parts by mass of the PVDC resin. Note that the pH adjusters are normally used when polymerizing the PVDC resin.

Olefin Resin

Examples of olefin resins used in the present invention include: polyethylenes polymerized using a single site catalyst or metallocene catalyst (hereinafter, referred to as "SSC") (including copolymers of ethylene and a small amount of α-olefin. For example, straight-chain low density polyethylenes (SSC-LLDPE) and straight-chain ultra-low density polyethylenes (SSC-VLDPE)), polyethylenes polymerized using a conventional Ziegler catalyst (including copolymers of ethylene and a small amount of α-olefin. For example, straight-chain low density polyethylenes (LLDPE) and ultra-low density polyethylenes (VLDPE or ULDPE)), ethylene/α-olefin copolymers (excluding those corresponding to the aforementioned polyethylenes), ethylene/vinyl acetate copolymers (EVA), ethylene/acrylic acid copolymers (EAA), ethylene/acrylic ester copolymers, ethylene/methacrylic acid copolymers (EMAA), ethylene/methacrylic ester copolymers, ethylene/methacrylic acid/acrylic ester copolymers, and other olefin resins. A crosslinked resin layer where the olefin resin is crosslinked is provided as a first surface layer, and therefore, the multilayer film of the present invention has excellent melt hole resistance, heat resistance, and mechanical strength Examples of the polyethylene or α-olefin used in the ethylene/α-olefin copolymer include α-olefins with 4 to 18 carbon atoms (such as 1-butene, 1-pentene, 4-methylpentene, and 1-octene). Furthermore, examples of the ethylene/acrylic ester copolymer include ethylene/methyl acrylate copolymers (ethylene/methacrylate copolymers (EMA)), ethylene/ethyl acrylate copolymers (EEA), ethylene/butyl acrylate copolymers, and the like, and examples of the ethylene/methacrylic ester copolymer include ethylene/methyl methacrylate copolymers (ethylene/methyl methacrylate copolymers (EMMA)), ethylene/ethyl methacrylate copolymers, ethylene/butyl methacrylate copolymers, and the like. Furthermore, the amount of vinyl acetate in the ethylene/vinyl acetate copolymer is preferably 5 to 30 mass %, the amount of the acrylic ester in the ethylene/acrylic ester copolymer is preferably 5 to 30 mass %, and the amount of methacrylic ester in the ethylene/methacrylic ester copolymer is preferably 5 to 30 mass %. One type of the olefin resin may be used alone or two or more types of these resins may be used in combination. Of the olefin resins, LLDPE, VLDPE, ULDPE, and ethylene/vinyl acetate copolymer are preferable from the perspective of stretching properties.

Ethylene/Vinyl Acetate Copolymer Resin

The ethylene/vinyl acetate copolymer resin (EVA resin) used in the present invention forms a second surface layer and functions as a sealing layer in the multilayer film of the present invention. By using the EVA resin as a sealing layer, the multilayer film of the present invention not only has excellent sealing strength, but deep draw forming at a low temperature of 90° C. or lower is possible. As a result, in packaging material manufactured by deep draw forming the multilayer film, the multilayer film can be cut straight open from an incision, and thus the packaging material can be easily opened.

Furthermore, in the multilayer film of the present invention, the EVA resin layer may be further provided on at least either (and preferably both) between the PVDC resin as the middle layer and crosslinked olefin resin layer as the first surface layer, or between the PVDC resin layer as the middle layer and the EVA resin layer as the second surface layer. Thus, the multilayer film of the present invention has an excellent heat shrinkage rate, piercing strength, tensile strength, or other film strength, and flexibility.

Adhesive Resin

Examples of the adhesive resin used in the present invention include ethylenic copolymers and acid-modified substances thereof. More specific examples can include ethylene/vinyl acetate copolymers (EVA), ethylene/acrylic acid copolymers (EAA), ethylene/methyl acrylatee copolymers (ethylene/methyl acrylate copolymers (EMA)), ethylene/ethyl acrylate copolymers (ethylene/ethyl acrylate copolymers (EEA)), ethylene/methacrylic acid copolymers (EMAA), ethylene/arylic acid copolymers (EAA), ionomers, other ethylenic copolymers, and modified substances thereof based on maleic acid, fumaric acid, acrylic acid, or other unsaturated carboxylic acid or acid anhydride. An adhesive layer containing the adhesive resin is provided in between the layers, and therefore, interlayer peeling is suppressed.

One type of the adhesive resin may be used independently, or two or more types thereof may be mixed and used. Furthermore, of the adhesive resins, an ethylene/vinyl acetate copolymer with 10 to 28 mass % of vinyl acetate, an ethylene/acrylic ester copolymer with 10 to 28 mass % of acrylic ester, or a modified substance thereof based on an unsaturated carboxylic acid or acid anhydride is preferably used.

Multilayer Film for Deep Draw Forming

The multilayer film of the present invention is provided with a resin layer containing the PVDC resin as a middle layer, a crosslinked resin layer where the olefin resin as a first surface layer is crosslinked, and a resin layer containing an EVA resin as a second surface layer, and an EVA resin layer is further provided between at least either (and preferably both) between the PVDC resin layer as the middle layer and crosslinked olefin resin layer as the first surface layer, or between the PVDC resin layer as the middle layer and EVA resin layer as the second surface layer. A resin layer containing the EVA resin between the PVDC resin and crosslinked olefin resin layer is crosslinked. Furthermore, an adhesive layer containing the aforementioned adhesive resin may be provided in between the layers in order to enhance interlayer adhesion. In this case, the adhesive layer between the PVDC resin and crosslinked olefin resin layer may be crosslinked.

Herein, specific examples of a layer configuration of the multilayer film of the present invention are described below, but the present invention is not limited thereto.

1: Crosslinked olefin resin layer/crosslinked EVA resin layer/PVDC resin layer/EVA resin layer/EVA resin layer.

2: Crosslinked olefin resin layer/crosslinked EVA resin layer/adhesive layer/PVDC resin layer/adhesive layer/EVA resin layer/EVA resin layer.

A thickness of the multilayer film of the present invention is normally 40 μm or more from the perspective of manufacturability. Furthermore, an upper limit of the thickness of the multilayer film of the present invention is preferably 150 μm or less. When the thickness of the multilayer film exceeds the upper limit, internal pressure when inflation stretching when manufacturing the film increases, and film formation tends to be difficult. Furthermore, if the multilayer film of the present invention is used as a bottom material film for deep draw forming, the thickness of the multilayer film is preferably 60 to 150 and if the film is used as a lid material film for deep draw forming, the thickness of the multilayer film is preferably 30 to 90 μm.

Furthermore, a thickness of the PVDC resin layer according to the present invention is preferably 1 to 20 more preferably 2 to 15 and particularly preferably 3 to 10 When the thickness of the PVDC resin layer is less than the lower limit, gas barrier properties tend to be reduced, and control of layer thickness during film formation tends to be difficult. On the other hand, when the thickness of the PVDC resin layer exceeds the upper limit, the rigidity of the obtained multilayer film tends to increase too much, and the film tends to be economically disadvantageous such as an increased amount of packaging material waste and the like. Note that if the multilayer film of the present invention is used as a bottom material film for deep draw forming, the thickness of the PVDC resin layer is preferably 2 to more preferably 2 to 15 and particularly preferably 2 to 10 Furthermore, if the multilayer film of the present invention is used as a cover material film for deep draw forming, the thickness of the PVDC resin layer is preferably 1 to 10 μm.

Furthermore, a thickness of the crosslinked olefin resin layer according to the present invention is preferably 1 to 20 and more preferably 2 to 15 When the thickness of the crosslinked olefin resin layer is less than the lower limit, melt hole resistance, heat resistance, and mechanical strength tend to be reduced, but on the other hand, when the thickness exceeds the upper limit, the multilayer film becomes too hard, and stretchability tends to be reduced.

A thickness of the EVA resin layer (sealing layer) as the second surface layer is preferably 1 to 50 and more preferably 5 to 30 When the thickness of the sealing layer is less than the lower limit, sealing strength tends to be reduced, and easily opening the packaging material tends to be difficult. On the other hand, when the thickness of the sealing layer exceeds the upper limit, the strength of the packaging material is insufficient, and film transparency tends to be reduced.

A thickness of the crosslinked EVA resin layer disposed between the PVDC resin layer and crosslinked olefin resin layer and EVA resin layer disposed between the PVDC resin layer and the EVA resin layer as the sealing layer is preferably 3 to 100 and more preferably 5 to 70 When the thickness of the crosslinked EVA resin layer and EVA resin layer is less than the lower limit, the piercing strength and tensile strength of the multilayer film is not only reduced, but the multilayer film strongly curls inward, and suitably for deep draw packaging machines tends to be reduced, but on the other hand, when the thickness exceeds the upper limit, an internal pressure when inflation stretching increases, and manufacturability tends to be reduced.

Furthermore, a thickness of the adhesive layer according to the present invention is preferably 1 to 10 μm, and more preferably 1 to 5 μm. When the thickness of the adhesive layer is less than the lower limit, interlayer adhesion tends to be reduced, but on the other hand, when the thickness exceeds the upper limit, improvement of an adhesive force that is higher cannot be expected, and the film tends to be economically disadvantageous such as an increased amount of packaging material waste and the like.

In the multilayer film of the present invention, a hot water shrinkage rate in the longitudinal direction and lateral direction at a temperature of 90° C. is preferably respectively 20 to 50%. When the hot water shrinkage rate is less than the lower limit, tight fittability with regard to a packaging target material tends to be reduced, but on the other hand, when the rate exceeds the upper limit, the orientation of an amorphous portion after stretching is not relaxed, and therefore, deep drawability tends to be reduced. Note that the hot water shrinkage rate is a value measured by the following method. In other words, a film sample marked at a distance of 10 cm in a machine direction (longitudinal direction, MD) of the multilayer film and a direction (lateral direction) orthogonal to the machine direction is immersed for 10 seconds in hot water adjusted to 90° C., removed, and then immediately cooled to ambient temperature water. Thereafter, the marked distance is measured to determine a ratio (percentage) of a reduced value from 10 cm to an original length of 10 cm. One sample is tested five times, and the average values in the longitudinal direction and lateral direction is set as the hot water shrinkage rate.

In the multilayer film of the present invention, oxygen gas permeability is preferably 100 $cm^3/m^2 \cdot day \cdot atm$ or less, more preferably 80 $cm^3/m^2 \cdot day \cdot atm$, and particularly preferably 50 $cm^3/m^2 \cdot day \cdot atm$ or less, under a 100% RH condition at 23° C. When the oxygen gas permeability exceeds the upper limit, deterioration such as losing a red tinge when storing packaging material or the like tends to occur when packaging a food product such as raw meat or the like which is a packaging target material that is prone to oxidize.

Furthermore, in the multilayer film, a water-vapor transmission ratio (WVTR) is preferably 20 $g/m^2 \cdot day$ or less under a 40° C., 90% RH condition, from the ullage of raw meat. When the water-vapor transmission ratio (WVTR) exceeds the upper limit, the amount of appreciation which is the mass of the packaging material tends to not be retainable.

Packaging Material

The packaging material of the present invention packages packaging target material such as raw meat, processed meat products, fish, cheese, fruit, pizza, or the like, using the multilayer film for deep draw forming of the present invention. The packaging material is provided with a lid material film and bottom material film formed from the multilayer film of the present invention, and packaging target material enclosed by the lid material film and bottom material film, where the crosslinked olefin resin layer according to the present invention is an outermost layer, and the EVA resin layer as the sealing layer is an innermost layer. The packaging material has excellent sealing strength of the lid material and bottom material, and can easily be opened. Furthermore, heat resistance, melt hole resistance, and mechanical strength are also excellent.

Method for Manufacturing Multilayer Film for Deep Draw Forming Next, a method for manufacturing the multilayer film for deep draw forming of the present invention will be described. A method of manufacturing a multilayer film for deep draw forming or the present invention is a method including: a step of irradiating an energy beam from the olefin resin layer side onto a multilayer unstretched film including a PVDC resin layer as a middle layer, a olefin resin layer as a first surface layer, and an EVA resin layer as a second surface layer, where an EVA resin layer is further provided at least either (and preferably both) between the PVDC resin layer as the middle layer and olefin resin layer as the first surface layer, or between the PVDC resin layer as the middle layer and EVA resin layer as the second surface layer, so as to crosslink the olefin resin, and then biaxially stretching in the longitudinal direction and lateral direction to prepare a multilayer biaxially stretched film; or a step of biaxially stretching in the longitudinal direction and lateral direction the multilayer unstretched film, irradiating an energy beam from the olefin resin layer side, and crosslinking the olefin resin to prepare a multilayer biaxially stretched film; and a step of performing a relaxation treatment in the longitudinal direction and lateral direction to obtain the multilayer of the present invention.

In the method for manufacturing the multilayer film of the present invention, the multilayer unstretched film further provided with an EVA resin layer at least either (and preferably both) between the PVDC resin layer and olefin resin layer (first surface layer), or between the PVDC resin layer and EVA resin layer (second surface layer) can be used to obtain the multilayer film of the present invention further provided with an EVA resin layer (crosslinked EVA resin layer between the PVDC resin layer and crosslinked olefin resin layer) at least either (and preferably both) between the PVDC resin layer and crosslinked olefin resin layer, or between the PVDC resin layer and EVA resin layer (sealing layer).

The multilayer unstretched film used in the method for manufacturing the multilayer film of the present invention can be prepared by co-extruding melted PVDC resin, olefin resin, and EVA resin to form a middle layer, first surface layer, and second surface layer for example, and then immersing and cooling the obtained co-extruded product in water at a temperature that is less than the melting point of all of the resins configuring the product (preferably 5 to 30° C.) for example. Furthermore, when preparing a tubular multilayer unstretched film, the resins are coextruded using a circular die such that the layer formed from the olefin resin is an outermost layer and the EVA resin layer is an innermost layer for example. In any case, the EVA resin layer is disposed at least either (and preferably both) between the PVDC resin as the middle layer and olefin resin layer as the first surface layer, or between the PVDC resin layer as the middle layer and the EVA resin layer as the second surface layer.

An energy beam is irradiated from the olefin resin layer side onto the multilayer unstretched film prepared in this manner. Furthermore, the energy beam may be irradiated after biaxially stretching the multilayer unstretched film. By irradiating the energy beam, the olefin resin is crosslinked, and the EVA resin layer disposed between the PVDC resin layer and olefin resin layer is also crosslinked, and thus a multilayer film with excellent melt hole resistance, heat resistance, and mechanical strength can be obtained. Furthermore, when the energy beam is irradiated before biaxially stretching, stretchability also improves.

A conventionally known energy beam such as an electron beam, ultraviolet ray, α-ray, β-ray, γ-ray, X-ray, or the like can be used as the energy beam, but from the perspective of a crosslinking effect before and after irradiating, an electron beam or γ-ray is preferable, and of these, the electron beam is advantageous from the perspective of workability and productivity in manufacturing a molded product. The irradiation conditions of the energy beam is preferably appropriately selected based on the type and intended application of the energy beam. In the case of an electron beam, an acceleration voltage is preferably within a range of 150 to 500 kilovolts, and the irradiation dose is preferably within a range of 10 to 200 kilograys.

Next, the multilayer unstretched film is heated by passing through a 70 to 90° C. hot water tank, and then biaxially stretched in the longitudinal direction and lateral direction to prepare a multilayer biaxially stretched film for example. If the multilayer unstretched film is tubular, the multilayer unstretched film is biaxially stretched in the longitudinal direction and lateral direction, while inserting air inside the tubular multilayer unstretched film, while pulling in the longitudinal direction (flow direction of tubular film), and therefore, a tubular multilayer biaxially stretched film is obtained. A stretching ratio is preferably 2.5 to 4 times in the longitudinal direction and lateral direction. When the stretching ratio is less than the lower limit, the fittability with regard to a desired packaging target material tends to be reduced, but on the other hand, when the ratio exceeds the upper limit, the film tends to break during stretching.

Next, if the olefin resin layer is not crosslinked, an energy beam is irradiated to crosslink the olefin resin along with the EVA resin layer disposed between the PVDC resin layer and olefin resin layer, and then a heat treatment is performed on the obtained multilayer biaxially stretched film, and a relaxation (loosening) treatment is performed in the longitudinal direction and lateral direction simultaneously with the heat treatment, and therefore, a multilayer film suitable for deep draw forming is obtained. If the multilayer biaxially stretched film is tubular, a multilayer biaxially stretched film bubble is formed while inserting air inside a folded tubular biaxially stretched film, a heat treatment was performed by bringing into contact with stream or hot water from an outer surface side of the multilayer biaxially stretched film bubble, and then a relaxation (loosening) treatment is performed in the longitudinal direction and lateral direction simultaneously with the heat treatment for example, and therefore, a multilayer film suitable for deep draw forming is obtained as a tubular body. Note that the tubular multilayer film is used in deep draw forming by cutting in the longitudinal direction (flow direction of the tubular film) and forming into a flat plate shape or other shape. The heat treatment temperature is preferably 60 to 95° C. When the heat treatment (relaxation treatment) temperature is less than the lower limit, there is a tendency where the relaxation treatment cannot be sufficiently improved, but on the other hand, when the temperature exceeds the upper limit, the film tends to wander and thus stable manufacturing is difficult. Furthermore, a relaxation ratio is preferably 10 to 40%. When the relaxation ratio is less than the lower limit, deep drawing suitability tends to be reduced, but on the other hand, when the ratio exceeds the upper limit, the film after relaxing tends to be unstable, and thus stable manufacturing is difficult.

EXAMPLES

The present invention will be described in further detail hereinafter based on examples and comparative examples, but the present invention is not limited to the following examples. Note that resins used in the Examples and Comparative Examples are collectively shown in the following Table 1 along with abbreviations therefor. Furthermore, manufacturing conditions of heat-shrinkable multilayer films in the Examples and Comparative Examples are collectively shown in the following Table 2.

TABLE 1

| Abbreviated name | Resin name | Manufacturer and grade | Density (g/cm³) | Melting point (° C.) |
|---|---|---|---|---|
| VLDPE1 | Ultra-low density polyethylene resin | "Moretec V-0398CN" manufactured by Prime Polymer, Co., Ltd. | 0.907 | 117 |
| VLDPE2 | Ultra-low density polyethylene resin | "Affinity PL-1850" manufactured by Dow Chemical Company | 0.902 | 98 |
| LLDPE | Liner low density polyethylene resin | "Moretec 0238CN" manufactured by Prime Polymer, Co., Ltd. | 0.916 | 122 |
| Ionomer | Ionomer resin | "Himilan AM79301" manufactured by DuPont-Mitsui Polychemicals | 0.94 | 92 |
| EVA1 | Ethylene/vinyl acetate copolymer resin | "Polene N8038F" manufactured by TPI Polene | 0.941 | 85 |
| EVA2 | Ethylene/vinyl acetate copolymer resin | "Polene N8036" manufactured by TPI Polene | 0.937 | 90 |
| EVA3 | Ethylene/vinyl acetate copolymer resin | "Evaflex V5714C" manufactured by DuPont-Mitsui Polychemicals | 0.94 | 89 |
| EMA | Ethylene/methyl acrylate copolymer resin | Resin with "Elvaloy 1218AC" (density: 0.94 g/cm³, melting point: 94° C.) and "Elvaloy 1209AC" (density: 0.927 g/cm³, melting point: 101° C.) manufactured by DuPont-Mitsui Polychemicals are mixed at a ratio of 33 mass %:67 mass % | — | — |
| EMAA | Ethylene/methacrylic acid copolymer resin | "Nucrel 0903HC" manufactured by DuPont-Mitsui Polychemicals | 0.93 | 102 |
| PVDC | Vinylidene chloride copolymer resin | Vinylidene chloride-vinyl chloride copolymer manufactured by Kureha Corporation | 1.71 | 140 |

TABLE 2

| | Layer configuration (layer thickness [μm]) | | | |
|---|---|---|---|---|
| | Outermost layer | Outer layer | Adhesive layer | Barrier layer |
| Example 1 | VLDPE1(5) | EVA1(36) | EMA(2.5) | PVDC(8) |
| Example 2 | VLDPE1(5) | EVA1(36) | EMA(2.5) | PVDC(8) |
| Example 3 | VLDPE1(8) | EVA1(50) | EMA(3) | PVDC(8) |
| Example 4 | VLDPE1(10) | EVA1(58) | EMA(3) | PVDC(8) |
| Example 5 | VLDPE1(3) | EVA1(20) | EMA(1.5) | PVDC(7) |
| Comparative example 1 | VLDPE1(34) | — | EMA(3) | PVDC(10) |
| Comparative example 2 | LLDPE(34) | — | EMA(3) | PVDC(10) |
| Comparative example 3 | VLDPE1(5) | EVA1(36) | EMA(2.5) | PVDC(8) |
| Comparative example 4 | VLDPE1(5) | EVA1(36) | EMA(2.5) | PVDC(8) |

| | Layer configuration (layer thickness [μm]) | | | |
|---|---|---|---|---|
| | Adhesive layer | Inner layer | Innermost layer | Film thickness [μm] |
| Example 1 | EMA(2.5) | EVA2(18) | EVA3(18) | 90 |
| Example 2 | EMA(2.5) | EVA2(18) | EVA3(18) | 90 |
| Example 3 | EMA(3) | EVA2(24) | EVA3(24) | 120 |
| Example 4 | EMA(3) | EVA2(30) | EVA3(28) | 140 |
| Example 5 | EMA(1.5) | EVA2(9) | EVA3(8) | 50 |
| Comparative example 1 | EMA(3) | — | Ionomer(40) | 90 |
| Comparative example 2 | EMA(3) | — | VLDPE2(40) | 90 |
| Comparative example 3 | EMA(2.5) | EVA2(18) | Ionomer(18) | 90 |
| Comparative example 4 | EMA(2.5) | EVA2(18) | EMAA(18) | 90 |

| | Manufacturing conditions | | |
|---|---|---|---|
| | Electron beam irradiation | Stretching ratio MD/TD | Relaxation ratio [%] MD/TD |
| Example 1 | Performed | 3.5/3.2 | 20/20 |
| Example 2 | Performed | 3.5/3.2 | 30/30 |
| Example 3 | Performed | 3.5/3.2 | 30/30 |
| Example 4 | Performed | 3.5/3.2 | 20/20 |
| Example 5 | Performed | 3.5/3.2 | 20/20 |
| Comparative example 1 | Not performed | 2.8/2.8 | 20/20 |
| Comparative example 2 | Not performed | 2.8/2.8 | 20/20 |
| Comparative example 3 | Performed | 3.5/3.2 | 20/20 |
| Comparative example 4 | Performed | 3.5/3.2 | 20/20 |

Example 1

First, the resins were melt extruded by a plurality of extruders, the melted resins were introduced in a circular die and fusion bonded to obtain the layer configuration described below, and then a coextrusion process was performed, such that the following lamination form was achieved in order from an outer side to an inner side and at a thickness (unit: μm) shown in the parenthesis: VLDPE1 (5)/EVA1 (36)/EMA (2.5)/PVDC (8)/EMA (2.5) EVA2 (18)/ EVA3 (18). A 180° C. molten circular body flowing from a die outlet was cooled to 10° C. in a water bath to obtain a circular body with a flat width of approximately 186 mm. Next, the obtained flat circular body was provided with an irradiation dose of 100 kilograys by irradiating an electron beam from an outer side of the flat circular body in an electron beam irradiating device with an acceleration voltage of 275 KeV to crosslink the outermost layer VLDPE1 and the EVA1 on an inner side thereof. The flat circular body was heated while passing through hot water at approximately 82° C., and then formed into a bubble-shaped tubular body while simultaneously biaxially stretched at a stretching ratio of 3.5 times in the longitudinal direction (MD) and 3.2 times in the lateral direction (TD) using an inflation method while cooling using 10° C. airing. Next, the obtained biaxially stretched film was guided into a cylindrical heat treating tube, formed into a bubble-shaped film, and then relaxation heat treated for approximately 2 seconds while 20% loosening in the longitudinal direction (MD) and 20% in the lateral direction (TD) at a temperature of 80° C. to obtain a circular biaxially stretched film with a flat width of approximately 477 mm. Both edges of the circular biaxially stretched film were cut, and a multilayer film for deep draw forming with a width of 425 mm was wound. The thickness of the obtained multilayer film for deep draw forming is shown in Table 2.

Examples 2 to 5 and Comparative Examples 1 to 4

Other than the layer configuration and manufacturing condition of the film were changed to the layer configurations and manufacturing conditions shown in Table 2, biaxially stretched films (multilayer films for deep draw forming) were obtain similarly to Example 1. The thickness of the obtained multilayer film for deep draw forming is shown in Table 2.

Evaluation of Properties of Multilayer Film for Deep Draw Forming (1) Melt Hole Resistance The multilayer films were covered at an opening portion of a container with an inner diameter of 20 mm, and a depth of 20 mm, and then the multilayer films were secured by a sealing packing with a diameter of 25 mm. Next, the inside of the container was made into a vacuum (0.005 MPa or less), the multilayer films were immersed for 10 seconds along with the container in hot water heated to a predetermined temperature, and then whether or not a hole formed in the multilayer films was confirmed. The operation was repeated five times at various temperatures while changing the temperature of the hot water to determine the highest temperature where even one hole does not form. The results are shown in Table 3.

(2) Peel Strength Between Lid Material/Bottom Material

Two of the same multilayer films were prepared and used as a lid material film and bottom material film. A towel was used as a packaging target material, and deep draw forming was performed at 110° C. and at an area draw ratio of 3.1 times in a mold with a length of 200 mm, width of 145 mm, and depth of 90 mm, using a deep draw forming machine ("R255" manufactured by Multivac) to seal the lid material film and bottom material film. A sealing strength of a sealed portion of the obtain packaging material was measured using a tensile testing machine ("RTC-1210 Type" manufactured by Orientec Co., Ltd.). The results are shown in Table 3.

(3) Lowest Draw Temperature

Deep draw forming was performed on the multilayer films at a predetermined draw forming temperature and at an area draw ratio of 3.1 times in a mold with a length of 200 mm, width of 145 mm, and depth of 90 mm, using a deep draw forming machine ("R255" manufactured by Multivac). Deep draw forming was performed while increasing the draw forming temperature 5° C. at a time from 75° C. to determine the lowest temperature where deep draw forming is possible. The results are shown in Table 3.

(4) Openablility

Two of the same multilayer films were prepared and used as a lid material film and bottom material film. A towel was used as a packaging target material, and deep draw forming was performed at the lowest draw temperature determined in the aforementioned (3) and at an area draw ratio of 3.1 times in a mold with a length of 200 mm, width of 145 mm, and depth of 90 mm, using a deep draw forming machine ("R255" manufactured by Multivac) to seal the lid material film and bottom material film. The obtained packaging material was immersed for 3 seconds in hot water at 90° C. to shrink the multilayer films, and then cooled in water at 20° C. An incision was cut by scissors into an edge portion of the packaging material was, and then the ease of opening when cutting open from the incision in the bottom material direction was determined based on the following standards. The results are shown in Table 3.

A: Easy straight opening from the incision was possible.
B: Incision was curved, and thus straight opening from the incision was not possible.
C: Interlayer peeling occurred at an incision tip end portion, and thus straight opening was not possible.

TABLE 3

|  | Melt hole resistance | Peel strength of between lid material/ bottom material [N/15 mm] | Lowest draw temperature | Sealability |
| --- | --- | --- | --- | --- |
| Example 1 | 85° C. | 18 | 85° C. | A |
| Example 2 | 85° C. | 18 | 85° C. | A |
| Example 3 | 85° C. | 25 | 85° C. | A |
| Example 4 | 85° C. | 28 | 85° C. | A |
| Example 5 | 85° C. | 11 | 85° C. | A |
| Comparative example 1 | 70° C. | 9 | 95° C. | C |
| Comparative example 2 | 95° C. | 25 | 105° C. | C |
| Comparative example 3 | 85° C. | 18 | 95° C. | C |
| Comparative example 4 | 85° C. | 18 | 95° C. | C |

As can be seen from the results shown in Table 3, the multilayer films for deep draw forming of the present invention (Examples 1 to 5) where the innermost layer is an ethylene/vinyl acetate copolymer resin layer have a higher peel strength between the lid material and bottom material as compared to if the innermost layer is an ionomer resin layer (Comparative Examples 1, 3) and if the innermost layer is an ethylene/methacrylic acid copolymer resin layer (Comparative Example 4).

Furthermore, the multilayer films for deep draw forming of the present invention (Examples 1 to 5) where the innermost layer is an ethylene/vinyl acetate copolymer resin layer can be easily opened as compared to if the innermost layer is an ionomer resin layer (Comparative Examples 1, 3), if the innermost layer is VLDPE (Comparative Example 2), and if the innermost layer is an ethylene/methacrylic acid copolymer resin layer (Comparative Example 4). This is because the multilayer films for deep draw forming of the present invention (Examples 1 to 5) can be deep draw formed at a low temperature as compared to if the innermost layer is an ionomer resin layer (Comparative Examples 1, 3), if the innermost layer is VLDPE (Comparative Example 2), and if the innermost layer is an ethylene/methacrylic acid copolymer resin layer (Comparative Example 4).

Furthermore, the multilayer films for deep draw forming of the present invention (Examples 1 to 5) with the crosslinked VLDPE as the outermost layer had excellent melt hole resistance as compared to if the VLDPE as the outermost layer was not crosslinked (Comparative Example 1). Note that the reason that the multilayer film of Comparative Example 2 has excellent melt hole resistance is because the outermost layer is formed using LLDPE which has a higher melting point than VLDPE.

INDUSTRIAL APPLICABILITY

As described above, according to the present invention, a multilayer film that can be deep draw formed at a low temperature of 90° C. or lower can be obtained, and by deep draw forming using the multilayer film, the obtained packaging material can be easily opened.

Therefore, the multilayer film for deep draw forming of the present invention is useful as a lid material film, bottom material film, or the like for deep draw forming.

The invention claimed is:
1. A multilayer film for deep draw forming, comprising:
a vinylidene chloride copolymer resin layer as a middle layer;
a crosslinked olefin resin layer as a first surface layer; and
an uncross-linked ethylene/vinyl acetate copolymer resin layer as a second surface layer;
wherein a resin of the uncross-linked ethylene/vinyl acetate copolymer resin layer as the second surface layer consists of an ethylene/vinyl acetate copolymer resin;
wherein an additional ethylene/vinyl acetate copolymer resin layer is provided at least either between the vinylidene chloride copolymer resin layer as, the middle layer and the crosslinked olefin resin layer as the first surface layer, or between the vinylidene chloride copolymer resin layer as the middle layer and the ethylene/vinyl acetate copolymer resin layer as the second surface layer;
wherein ethylene/methyl acrylate copolymer layers as an adhesive layer are provided on both sides of the vinylidene chloride copolymer resin layer as the middle layer;
wherein a thickness of the additional ethylene/vinyl acetate copolymer resin layer is 5 to 70 µm; and
wherein when the multilayer film is subjected to deep draw forming while increasing a draw forming temperature in 5° C. increments from 75° C., in a mold with a length of 200 mm, width of 145 mm, and depth of 90 mm, and at an area draw ratio of 3.1, using a deep draw forming machine, a lowest draw temperature is 85° C. or less, where the lowest draw temperature is a lowest temperature at which the deep draw forming can be carried out.

2. The multilayer film for deep draw forming according to claim 1, obtained by a method comprising the steps of:

providing a multilayer unstretched film including a vinylidene chloride copolymer resin layer as a middle layer, an olefin resin layer as a first surface layer, an uncross-linked ethylene/vinyl acetate copolymer resin layer as a second surface layer, and an additional ethylene/vinyl acetate copolymer resin layer, wherein the additional ethylene/vinyl acetate copolymer resin layer is provided at least either between the vinylidene chloride copolymer resin layer as the middle layer and the olefin resin layer as the first surface layer, or between the vinylidene chloride copolymer resin layer as the middle layer and the ethylene/vinyl acetate copolymer resin layer as the second surface layer,
wherein ethylene/methyl acrylate copolymer lavers as an adhesive layer are provided on both sides of the vinylidene chloride copolymer resin layer as the middle layer,
wherein the first surface layer, the middle layer and the second surface layer of the multilayer unstretched film respectively correspond to the first surface layer, the middle layer and the second surface layer of the multilayer film;
irradiating an energy beam onto the multilayer unstretched film and then biaxially stretching the irradiated multilayer unstretched film 2.5 to 4 times in a longitudinal direction and a lateral direction to obtain a multilayer biaxially stretched film;
wherein when the additional ethylene/vinyl acetate copolymer resin layer is provided between the vinylidene chloride copolymer resin layer as the middle layer and the olefin resin layer as the first surface layer, the irradation is performed from the olefin resin layer side so as to crosslink the olefin resin and the ethylene/vinyl acetate copolymer resin; and
performing a 10 to 40% relaxation treatment in the longitudinal direction and the lateral direction on the multilayer biaxially stretched film.

3. A packaging material, comprising:
a bottom material film for deep draw forming, comprising the multilayer film for deep draw forming according to claim 1;
a lid material film for deep draw forming, comprising the multilayer film for deep draw forming according to claim 1; and
a packaging target material enclosed by the bottom material film and lid material film; wherein
the crosslinked olefin resin layer is an outermost layer, and the ethylene/vinyl acetate copolymer resin layer is an innermost layer.

4. A method of manufacturing a multilayer film for deep draw forming according to claim 1, comprising the steps of:
providing a multilayer unstretched film including a vinylidene chloride copolymer resin layer as a middle layer, an olefin resin layer as a first surface layer, an ethylene/vinyl acetate copolymer resin layer as a second surface layer, and an additional ethylene/vinyl acetate copolymer resin layer, wherein the additional ethylene/vinyl acetate copolymer resin layer is provided at least either between the vinylidene chloride copolymer resin layer as the middle layer and olefin resin layer as the first surface layer, or between the vinylidene chloride copolymer resin layer as the middle layer and ethylene/vinyl acetate copolymer resin layer as the second surface layer,
irradiating an energy beam onto the multilayer unstretched film and then biaxially stretching 2.5 to 4 times in a longitudinal direction and a lateral direction to prepare a multilayer biaxially stretched film, or biaxially stretching the mltilayer unstretched film 2.5 to 4 times in a longitudinal direction and a lateral direction and then irradiating an energy beam onto the thus obtained film to prepare a multilayer biaxially stretched film;

wherein when the additional ethylene/vinyl acetate copolymer resin layer is provided between the vinylidene chloride copolymer resin layer as the middle layer and the olefin resin layer as the first surface layer, the irradiation is performed from the olefin side, so as to crosslink the olefin resin and the ethylene/vinyl acetate copolymer resin; and wherein the first surface layer, the middle layer and the second surface layer of the multilayer unstretched film respectively correspond to the first surface layer, the middle layer and the second surface layer of the multilayer film; and performing a 10 to 40% relaxation treatment in the longitudinal direction and the lateral direction to obtain the multilayer film for deep draw forming.

5. The multilayer film for deep draw forming according to claim 1, obtained by a method comprising the steps of:

providing a multilayer unstretched film including a vinylidene chloride copolymer resin layer as a middle layer, an olefin resin layer as a first surface layer, an uncross-linked ethylene/vinyl acetate copolymer resin layer as a second surface layer, and an additional ethylene/vinyl acetate copolymer resin layer, wherein the additonal ethylene/vinyl acetate copolymer resin layer is provided at least either between the vinylidene chloride copolymer resin layer as the middle layer and the olefin resin layer as the first surface layer, or between the vinylidene chloride copolymer resin layer as the middle layer and the ethylene/vinyl acetate copolymer resin layer as the second surface layer;

wherein ethylene/methyl acrylate copolymer layers as an adhesive layer are provided on both sides of the vinylidene chloride copolymer resin layer as the middle laver; and wherein the first surface layer, the middle layer and the second surface layer of the multilayer unstretched film respectively correspond to the first surface layer, the middle layer and the second surface layer of the multilayer film;

biaxially stretching the multilayer unstretched film 2.5 to 4 times in a longitudinal direction and a lateral direction and then irradiating an energy beam onto the multilayer stretched film to obtain a multilayer biaxially stretched film;

wherein when the additional ethylene/vinyl acetate copolymer resin layer is provided between the vinylidene chloride copolymer resin layer as the middle layer and the olefin resin layer as the first surface layer, the irradation is performed from the olefin resin layer side so as to crosslink the olefin resin and the ethylene/vinyl acetate copolymer resin; and performing a 10 to 40% relaxation treatment in the longitudinal direction and the lateral direction on the irradiated multilayer biaxially stretched film.

6. The multilayer film for deep draw forming according to claim 1, wherein when the additional ethylene/vinyl acetate copolymer resin layer is provided between the vinylidene chloride copolymer resin layer as the middle layer and the crosslinked olefin resin layer as the first surface layer, the additional ethylene/vinyl acetate copolymer resin is crosslinked.

* * * * *